July 22, 1952  J. M. LAMBERT ET AL  2,604,442
PRODUCTION OF METAL POWDERS OF SMALL SIZE
Filed May 12, 1950
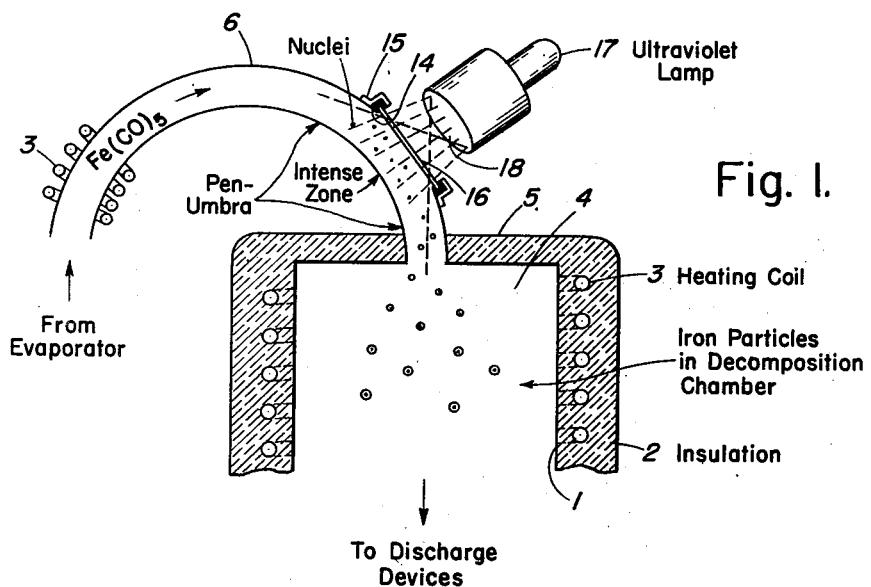
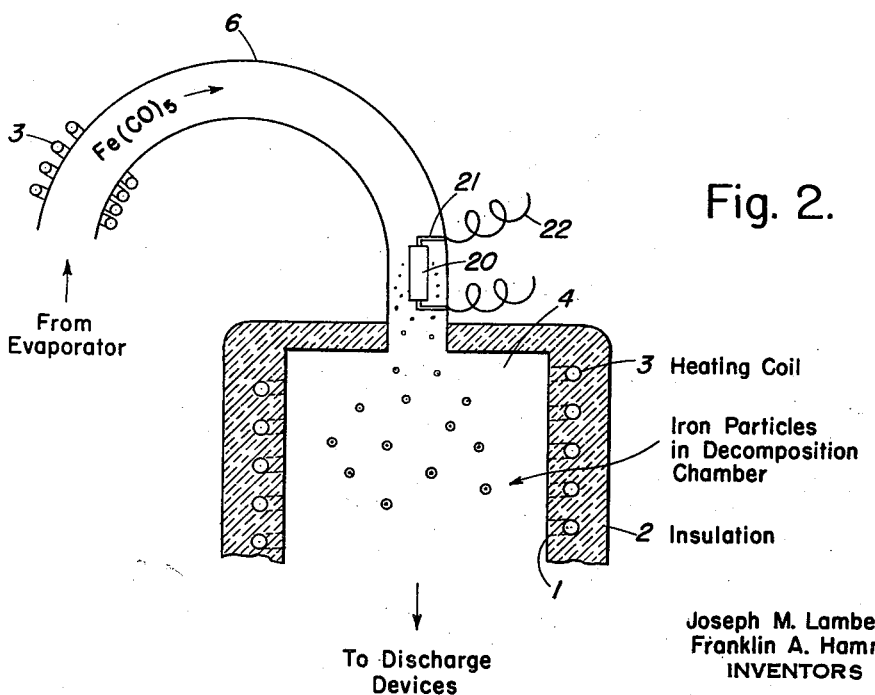
Joseph M. Lambert
Franklin A. Hamm
INVENTORS Patented July 22, 1952

2,604,442

UNITED STATES PATENT OFFICE 2,604,442

PRODUCTION OF METAL POWDERS OF SMALL SIZE

Joseph M. Lambert and Franklin A. Hamm, Easton, Pa., assignors to General Aniline & Film Corporation, New York, N. Y., a corporation of Delaware Application May 12, 1950, Serial No. 161,552

5 Claims. (Cl. 204—157)

The present invention relates to the production of metal powders of particularly small size by the thermal decomposition of metal carbonyls.

The decomposition of a metal carbonyl such as the carbonyl of iron or nickel or mixtures thereof is described, for example, in U. S. P. 1,759,659 and U. S. P. 1,759,661 and is usually effected by introducing the carbonyl in its vaporized form into a heated vessel in such a manner that the decomposition takes place substantially in the free space of the vessel instead of by contact with the heated walls of the vessel. The metal carbonyl decomposes with the formation of carbon monoxide gas and finely divided metal which is conducted out of the decomposer space by the gas stream and is separated by mechanical, magnetic, or other means.

Metal powders, such as those of iron, nickel and cobalt, produced in this manner have a wide particle size distribution of say from 2 to 20 microns, and contain usually chemically combined carbon and oxygen, the amount of which is dependent primarily upon the temperature at which the decomposition of the carbonyl is carried out. For example, at a decomposition temperature of from 250° to 300° C., the carbon content of the iron powder produced may amount to .9% to 1.2% and above.

One of the most promising applications of finely divided metal powders lies in the electronic field as magnetic materials. Recent developments in the use of such magnetic materials have shown that besides a suitable carbon content, the size of the individual metal particles as well as the particle size distribution of a mixture of such particles are of the greatest importance for the performance in electric devices, particularly in the high frequency and ultra-high frequency field. For applications in the range of say 10 to 50 megacycles and above, iron particles having a diameter of 3 to 4 microns or less perform satisfactorily, whereas the performance of particles with an average diameter of 6 to 8 microns is inferior. Particles with even larger diameters are of little utility for high frequency work.

As the metal carbonyl decomposition process has been heretofore operated, it invariably led to mixtures having a large percentage of oversized particles, i. e., particle sizes having a diameter of 12 microns or above. This is not surprising when one considers the mechanism of decomposition. Thus the carbonyl vapor enters the hot zone and becomes heated therein. Those molecules which occupy the more favorable position receive heat faster than others and will accordingly decompose first with the formation of metal nuclei. Once a certain number of nuclei have formed, the vapor will decompose on the nuclei and contribute to their growth in preference to forming new nuclei. This is attributable to the fact that the initially formed nuclei will receive more radiant heat than the carbonyl vapor due to their much higher absorption coefficients, and thus become sources of heat for neighboring vapor molecules which will decompose on contact with them.

Considerable effort has been made in the past to separate such mixtures of particles of widely different sizes into suitable fractions to remove the undesirable particles above a certain maximum size. However, no improvements have been devised for the decomposition process itself which would automatically eliminate the formation of oversized particles or result in powders of a definite, desired particle size As a matter of fact, the art had about concluded that the only way to obtain uniform particles of the desired size was by the fractionation method.

We have now found that the thermal decomposition of metal carbonyls can be effected to yield metal powders with a closely controlled particle size distribution and of a particle size ranging from about 3 to 7 microns in diameter by an artificial increase in the number of particle nuclei per unit quantity of metal carbonyl. This increase may be achieved according to our invention by supplying in suitable form and at a prearranged time a type of radiant energy which is capable of producing an initial decomposition of a large number of carbonyl vapor molecules which subsequently act as nuclei upon which the carbonyl vapor thermally decomposes, i. e., centers of further decomposition. In other words, our procedure envisages the thermal decomposition of the metal carbonyl onto nuclei supplied through the use of radiant energy rather than by the normal thermal decomposition of the metal carbonyl.

To illustrate, it may be pointed out that under normal conditions, 1 lb. of iron carbonyl vapor decomposes into approximately 500 billion particles weighing a total of approximately 130 grams. Half of this weight, or 65 grams, is made up of particles of diameters larger than 7 microns while the other half is made up of particles having a smaller diameter. By our procedure it is possible to form a larger number of particles, i. e., about 4000 billion from 1 lb. of iron carbonyl vapor. Again the total weight of the particles will be 130 grams but the average weight of a particle will be only one-eighth of what it had been, and accordingly the average diameter of the particles will be approximately one-half, or 3.5 microns instead of about 7 microns.

The preparation of carbonyl metal powders of extremely small diameter and of uniform size distribution by the initial simultaneous decomposition of a large number of carbonyl vapor molecules by means of a certain type of radiant energy and upon which the carbonyl metal builds by thermal decomposition of the metal carbonyl, constitute the purposes and objects of the present invention.

The metal carbonyl which may be of any metal having electromagnetic properties such as iron, cobalt, nickel and molybdenum is effected in the free space of a metal tower having a height of about 16 feet and a diameter of about 3 feet. Such decomposition is effected at a temperature ranging from about 150 to 350° C. and a pressure of from about 1 to 2 atm. Usually the rate of feed of the metal carbonyl for a reactor of the above dimensions is of the order of 1 cu. ft. per minute.

The supply of nuclei upon which the carbonyl metal builds is effected, as stated, by the use of a type of radiant energy which causes the metal carbonyl vapor to decompose faster than its decomposition can be caused by purely thermal means. For instance, a narrow metal carbonyl vapor inlet to the reactor may be equipped with a suitable window which is permeable to violet or ultraviolet radiation. A violet or an ultraviolet light source is selected which has an emission lying in a region where the metal carbonyl, such as iron carbonyl, has a suitable absorption coefficient, i. e., in the region of 250 to 450 m$\mu$. The source is placed outside the window while the metal carbonyl vapor passes to the reactor, absorbing the radiation and decomposing prematurely to form the required large number of nuclei. The nuclei then grow into the desired size particles by the thermal decomposition thereon of the metal carbonyl in the customary manner.

The ultraviolet light source may also be located within the interior of the metal carbonyl vapor inlet. In this case a cylindrical ultraviolet light source may be suspended by brackets in the inlet tube, the brackets serving to connect with an electric circuit.

The energy designed to effect the desired decomposition may also be supplied in other ways. Thus, the metal carbonyl passing through the inlet tube may be irradiated with waves of wave lengths approximating that of X-rays and gamma-rays emanating from a Roentgen or Coolidge tube located adjacent to the inlet tube, or such metal carbonyl vapor may be bombarded with electrons from an electron gun of the type found in electron microscopes. It is also feasible to employ radioactive radiation supplied by radioactive elements such as radon or radium located inside the reactor at the top thereof, or above the decomposition zone.

Alternately a radioisotope of iron, such as $Fe^{59}$ is transformed into $Fe^{59}(CO)_5$ and the radioactive compound then used as an additive to the regular iron carbonyl. The radiation from the disintegration of the radioactive iron controls the production of nuclei.

The invention is further illustrated in the accompanying drawing, in which

Fig. 1 is a diagrammatic section partly cut away of a front elevation of a reactor equipped with means for irradiating the metal carbonyl with ultraviolet light; and Fig. 2 discloses a modification of Fig. 1.

Referring to Fig. 1, the reactor indicated by reference numeral 1 comprises a steel tower of the aforestated dimensions provided with heat insulation 2 and coils 3 for supplying heat to the reactor to raise the reaction zone indicated by reference numeral 4 to the desired reaction temperature. The top 5 of reactor 1 has an inlet tube 6 for feeding metal carbonyl into the reactor. Said inlet tube 6 is provided with an opening 14 surrounded by gaskets 15 which seat a quartz window 16.

Mounted adjacent the reactor 1 is an ultraviolet lamp 17, the rays 18 from which are directed upon window 16 so that the rays contact the metal carbonyl as it is being fed into the reactor. As a consequence of this irradiation, carbonyl metal is formed in the inlet 6 prior to the entrance of the carbonyl vapor into the reaction zone 4 of reactor 1.

According to Fig. 2, the source of the ultraviolet light is located within the metal carbonyl inlet tube rather than outside of the same. A cylindrical ultraviolet light source (e. g. fluorescent light) 20 is supported by metal brackets 21 in the inlet tube 6. The brackets are connected to an electric circuit indicated generally by reference numeral 22.

As in Fig. 1, the ultraviolet light emanating from element 20 effects instantaneous decomposition of a part of the carbonyl vapor to provide numerous nuclei serving for the deposition of carbonyl metal produced by thermal decomposition within the reactor.

The following example when taken in connection with the drawing will serve to further explain the invention.

*Example*

The reaction space 4 of reactor 1 of Fig. 1 is heated to 250° C. by heating fluid circulated through coil 3. Iron pentacarbonyl is vaporized and fed through inlet tube 6 into reactor 1 at a rate of about 1.8 lbs. per minute. Approximately 2 feet above the upper limit of decomposition zone 4, it passes under a strong beam 18 of ultraviolet light emitted from a mercury arc quartz lamp 17 having a rating of 250 watts, thereby exposing the vapor to a radiation between 250 and 450 m$\mu$. The radiation is absorbed by the carbonyl vapor, resulting in incipient decomposition before the vapor enters the reaction zone. The permanently decomposed molecules form nuclei for the formation thereon of further quantities of carbonyl iron resulting from the thermal decomposition. The weight-average size of the iron recovered by this method is 5 to 5.5 microns as determined by the Roller Particle Size Analyzer.

The powder is made into a core of ¾" length and ⅜" diameter by compression in the usual way after first insulating the powder with phosphoric acid while utilizing a furfural-formaldehyde resin as a binder and powdered wax as a lubricant, and the core so made compared with a core of the same size and made in the same way but from carbonyl iron obtained in the usual manner and having larger size particles. A comparison is effected with a Q-meter and a suitable coil. The comparison shows that the new powder has a Q which is 15% higher than that of the old powder at 20 megacycles.

Various modifications of the invention will occur to persons skilled in the art. Thus, instead of decomposing the vapors of a single metal carbonyl, vapors of a mixture of carbonyls may be employed, such as of iron and nickel, nickel and cobalt, and the like. Similarly, other types of energy such as that previously mentioned may be utilized in lieu of the ultraviolet lamp of the example. We accordingly do not intend to be limited in the patent granted except as necessitated by the appended claims.

We claim:

1. In the process of producing metals of a very small particle size and uniform size distribution by thermally decomposing a metal carbonyl in the free decomposition space of a reactor, the improvement which comprises subjecting the metal carbonyl, just prior to its admission into said decomposition space, to a radiation with radiant energy to cause decomposition of a part of the metal carbonyl with the formation of metal particles serving as nuclei for the deposition thereon of metal produced by the thermal decomposition of the metal carbonyl in said free decomposition space.

2. The process as defined in claim 1 wherein the radiant energy is ultraviolet light.

3. The process as defined in claim 1 wherein the radiant energy is derived from an electron gun.

4. The process as defined in claim 1 wherein the radiant energy is derived from a radioactive element.

5. The process as defined in claim 1 wherein the radiant energy is derived from a radioisotope of iron.

JOSEPH M. LAMBERT.
FRANKLIN A. HAMM.

REFERENCES CITED

The following references are of record in the file of this patent:

UNITED STATES PATENTS

| Number | Name | Date |
|---|---|---|
| 1,759,659 | Mittasch et al. | May 20, 1930 |
| 1,759,661 | Muller et al. | May 20, 1930 |
| 1,836,732 | Schlecht et al. | Dec. 15, 1931 |